United States Patent Office 2,754,735
Patented July 17, 1956

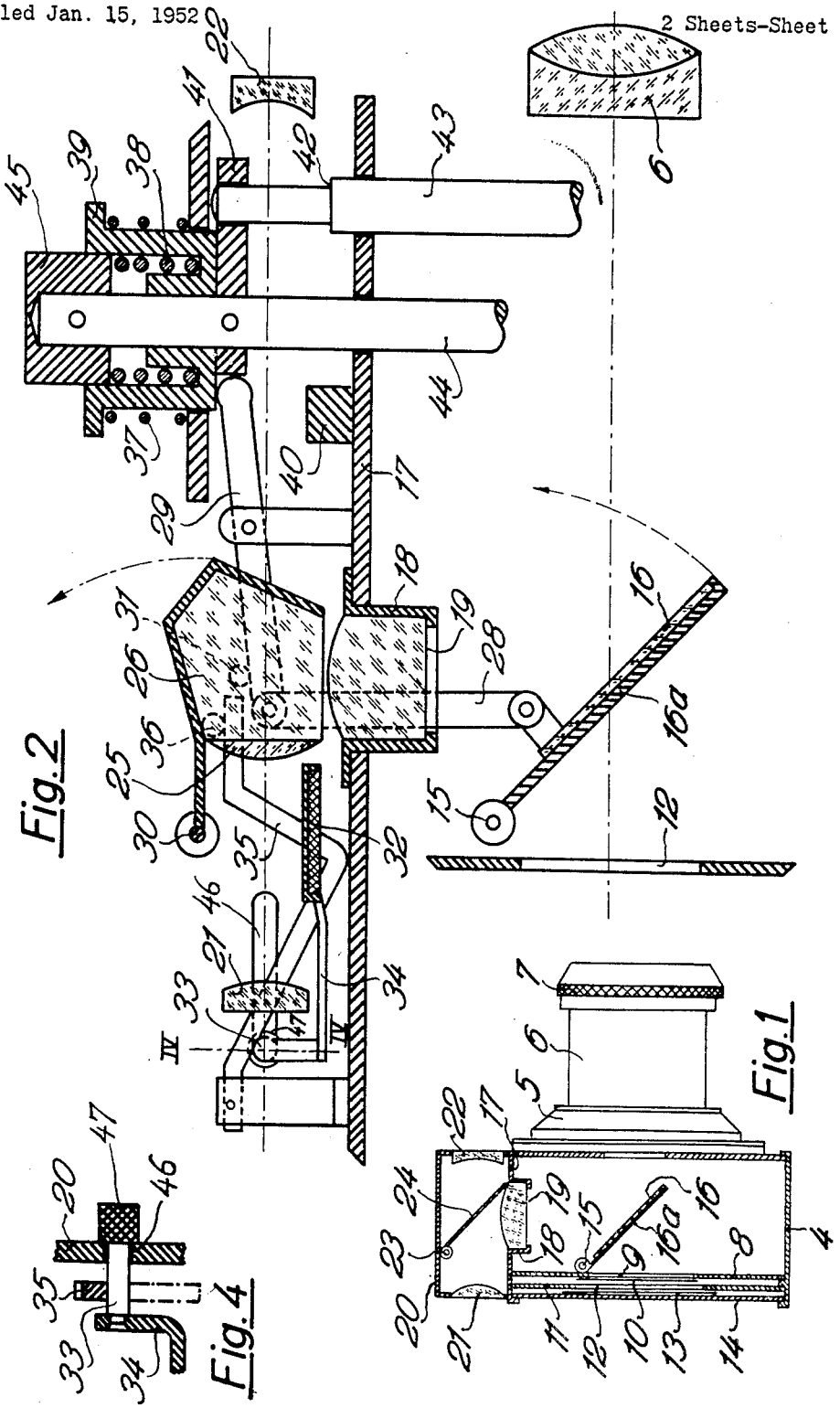

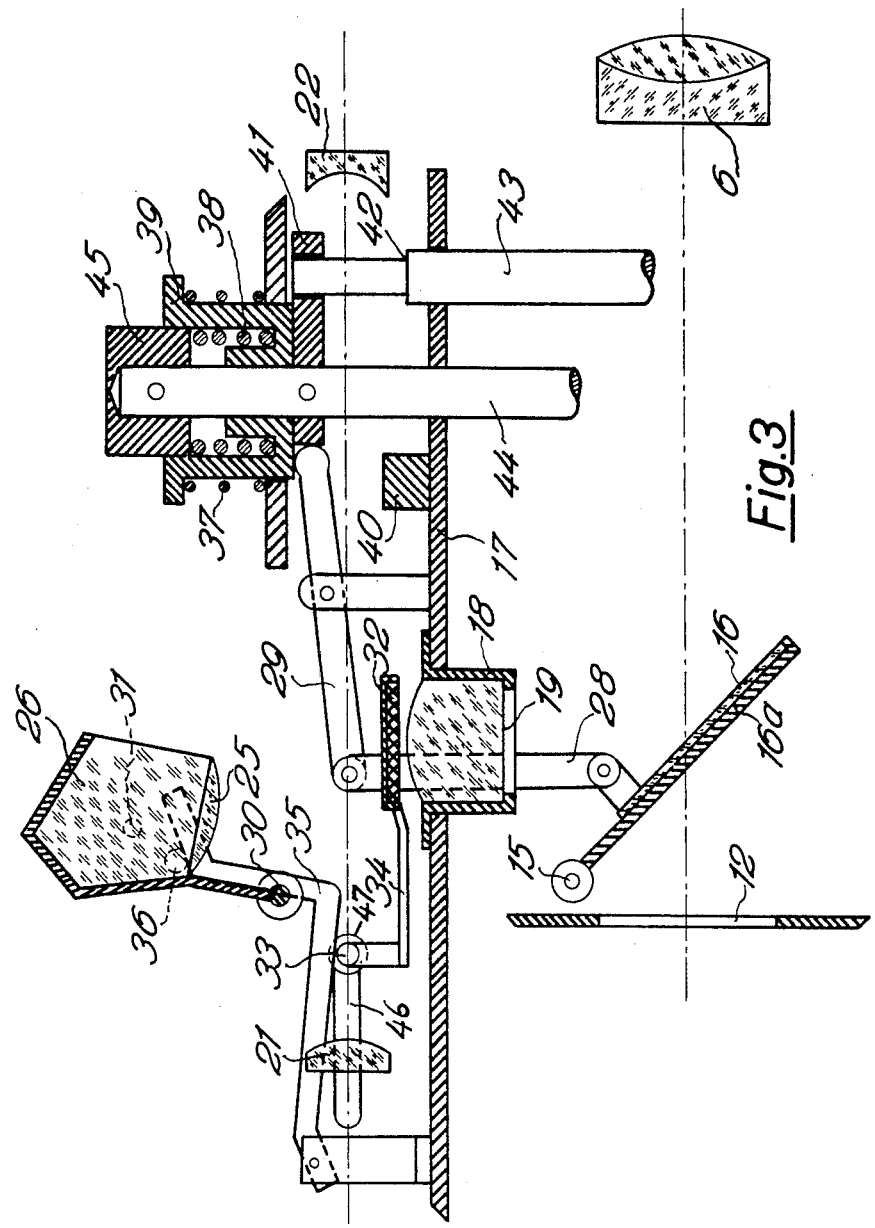

2,754,735

REFLEX CAMERA WITH VIEWFINDER PHOTOCELL

Fritz Meyer, Flensburg, Germany, assignor to Agfa Camera-Werk Aktiengesellschaft, Munchen, Germany Application January 15, 1952, Serial No. 266,562

Claims priority, application Germany January 17, 1951

5 Claims. (Cl. 95—42)

The present invention relates to a mirror reflex camera in which focusing of the object to be photographed is effected by means of the camera lense and in which a direct-view finder or a Newton finder is provided for determining the outline of the picture to be taken.

An object of the present invention is to provide a camera of above character which can be combined with an exposure meter.

Another object of the present invention is to provide a camera of above character in which for focusing, only a small portion of the picture is visible within the finder and in which by moving a part of the finder reflecting means the finder can be used as a direct-view or Newton finder.

Another object of this invention is to provide a camera in which the control means of the camera for focusing and for determining the outline of the picture are combined with the shutter of the camera.

Another object of the present invention is to provide a camera in which a finder reflecting member is arranged movably so that it can be brought into an ineffective position in order that a part of an exposure meter can be brought into the path of the light beam entering through the camera objective.

Still another object of this invention is to provide means by which unisonal movement of the exposure meter (photocell) and the finder reflecting member is possible. Finally, this invention intends to provide a camera of the above type in which the exposure measuring, the control of focus and of the proper picture outline can be effected without releasing the shutter of the camera.

It is well known that the amount of light entering the objective of a mirror reflex camera can be measured by the photocell of an exposure meter for the purpose of determining the time of exposure. However, by interposing the opaque photocell in the path of light of the camera lense, the picture on the ground glass screen disappears so that in the finder a determination of the picture outline with the aid of the ground glass screen is rendered impossible.

The present invention refers particularly to a mirror reflex camera with a Newton finder arranged above the ground glass screen. According to this invention, change from ground glass screen picture to Newton finder picture is effected automatically when the photocell or the like of the exposure meter is being inserted. Thus, in the Newton finder a picture with an outline becomes visible, the light intensity of which is being measured.

The invention will now be described in detail in connection with the accompanying drawings which show a preferred embodiment thereof.

Fig. 1 shows diagrammatically a vertical longitudinal cross-section through the camera according to this invention;

Fig. 2 is an enlarged vertical cross-section through a portion of the camera showing in an enlarged scale parts of the finder, of the control elements for the finder, of the shutter release, and of the exposure meter;

Fig. 3 is an enlarged vertical cross-section similar to Fig. 2, showing, however, the finder reflecting member disengaged and the exposure meter in working position; and Figure 4 is an enlarged partial cross-sectional view taken along line IV—IV of Figure 2.

Because the construction of a mirror reflex camera is generally known in the art it is considered not necessary to describe all details of the camera itself and its operation. The camera may be of any suitable type. Referring to Fig. 1 of the drawing numeral 4 designates the housing of a camera the front wall of which carries the usual means 5 for focusing and a mounting for the camera objective 6 which is provided with diaphragm means (not shown in the drawing) and a knurled ring 7 for turning the camera lense unit 6 in its mounting.

A wall 8 at the back of the interior camera chamber is provided with an aperture 9 behind which a sliding shutter 10 or the like is movably provided. Furthermore the camera has an intermediate partition 11 with a window 12 which determines the size of the picture to be taken. A film 13 with light-sensitive coating is indicated behind this window and can be moved for exposure by any well known means which need not further be described. The camera back is indicated at 14. At a point 15 within the camera chamber is pivotally mounted a reflecting mirror 16 upon a carrier 16a, by means of which light rays entering through the camera lense 6 are reflected. In the upper wall 17 of the camera is provided a lense 19 in a suitable mounting 18, which is apt to serve as a ground glass screen lense. The reference number 20 generally designates a direct-view finder or Newton finder which carries an eyepiece or ocular 21 and an object-glass 22. A reflecting member, generally designated at 24, that may be semi-transparent, is pivotally mounted at 23 within the finder.

Referring to Fig. 2, the camera lense 6 projects a picture, after being reflected by mirror 16, on to the dull plane side of the lense 19. By the combined action of finder ocular 21, an air-cemented lense 25 and the ground-glass screen lense 19, the ground glass screen picture is considerably enlarged for the purpose of focusing, and this permits a very advantageous accuracy when setting the camera lense 6. By dividing the refractional power (between several lenses) as above, the refractional power of the finder ocular 21 can be kept low with the result that a favourable adaption of the finder ocular to the finder object-glass 22 can be obtained, because a great focal length of the finder ocular is advantageous for obtaining a convenient picture frame size of the finder object-glass and for a distortion-free finder system. On account of the path of light-rays within a roof-edge penta prism 26, the eye behind the finder ocular 21 perceives the ground glass screen picture upright and side-correct, and no "picture jump" occurs when passing over from the ground glass screen picture to the Newton finder picture when the roof-edge penta prism 26 is swung out, as will be described later. In other words: no "picture jump" occurs when after focusing the picture the roof-edge penta prism 26 is swung out of the way for determining the outline of the picture by means of the ocular 21 and the finder object-glass 22.

The reflecting mirror 16 mounted for swinging movement about point 15 within the camera chamber is connected to a pivot lever 29 through a linkage 28. The roof-edge penta prism 26, pivoted for swinging movement about point 30, rests with a pin 31 upon the lever 29. This arrangement ensures that the mirror 16 and the penta prism 26 swing simultaneously when the lever 29 is operated. However, by the fact that the penta prism 26 with its pin 31 only rests on the lever 29 it can be swung out independently from the reflecting mirror 16.

For measuring the exposure time by light measuring, a photocell 32 or the like is moved into position in front of the ground glass screen 19 (see Fig. 3) by means of suitable mechanisms such as, for example, lever or carrier 34 and pin 33. The pin is slidable in a slot 46 provided in the housing 20 of the direct view finder. A knob 47 affixed to the outer end of pin 33 (Figure 4) may be provided to permit the operator to move the photocell 32 into any desired position. Simultaneously with the movement of the photocell 32 a one-arm lever 35 is raised by means of the pin 33 secured to the carrier 34 of the photocell 32. A pin 36 also secured on the roof-edge penta prism 26 rests upon the outer end of lever 35. This arrangement provides that the penta prism 26 can be swung out independent from the reflecting mirror 16, 16a, when the photocell 32 is moved into its working position. With the parts in this position the picture by the camera lense 6 is projected through the ground glass screen 19 and onto the photocell 32 for measuring the exposure time and the picture with true outlines appears before the eye within the Newton finder. Thus, the picture outlines and the light value for determining the exposure time are obtained simultaneously.

After the exposure time required has been measured, the photocell is returned into its inoperative position at the same time the roof-edge penta prism 26 by gravity or by the aid of a spring (not shown), automatically returns into its original position (Fig. 2). The eye again sees the enlarged ground glass screen picture for focusing purposes.

The manipulation of the camera for taking a picture will now be described. After focusing (Fig. 2) a release button 45 is operated which first compresses a spring 37 without compressing a second spring 38 accommodated within a slidable sleeve 39, because the tension of the spring 38 is larger than the combined resistance of lever 29, of spring 37, and of the weight of the parts connected to lever 29. During compressing of spring 37, the actuating arm of lever 29 moves downward until it contacts a stop 40 fixed to the camera housing. By the movement of the lever 29 the roof-edge penta prism 26 and the reflecting mirror 16, 16a, are both swung upwards. The eye now sees the Newton finder picture and the reflecting mirror 16, 16a has cleared the way for the light rays from the camera lense 6 to the film 13. When compressing of the release button 45 is continued the spring 38 is being compressed too. After a short idle movement, a release finger 41 secured to a shaft 44 of the release button 45 engages a shoulder 42 of a shutter release shaft 43 and pushes shaft 43 downwards, thereby releasing the shutter 10 which up to now covered the picture window 12.

Thus, as above described, the swinging movement of the reflecting mirror 16 and the release of the camera shutter are coupled. The two operating movements (disengaging or swinging upwards of the parts 16 and 26 on the one hand and releasing of the shutter on the other hand) are, however, noticeably separated by the stop 40 (pressure point) and the subsequent short distant idle movement of the parts 41, 44, 45. Thus a premature release of the shutter is hardly possible. Furthermore, at any time it is possible to swing the parts 16 and 26 upward by a gentle pressure on button 45, and by releasing the button 45 again to return them into their operative position for renewed observation and focusing, or, if desirable, for taking a new exposure measurement without releasing the shutter.

All parts of the operating mechanisms are arranged outside the path of the light beams of the camera lense and of the finder.

While I have shown and described in some detail a specific embodiment of my invention, I do not intend to be limited thereto but desire to claim my invention as broad as the appended claims and the prior art will permit.

I claim:

1. In a mirror reflex photographic camera having an objective and a shutter-release lever, a direct vision view finder, a reflecting member, means for pivotally mounting said reflecting member within said view finder to swing in and out of the path of rays passing through said view finder, a ground glass screen, a reflecting mirror pivotally mounted within the camera casing to reflect the light rays passing through said objective onto said ground glass screen, said ground glass screen being fixedly arranged between said reflecting mirror and said reflecting member for the purpose of focusing said objective, a photoelectric cell, means for moving said photoelectric cell from an inoperative position to an operative position in alignment with said ground glass screen to enable measurement of the intensity of the light rays reflected by said reflecting mirror, first lever means connecting said photoelectric cell and said reflecting member to swing said reflecting member out of the path of the rays passing through said view finder upon movement of said photoelectric cell adjacent said ground glass screen, and second lever means connecting said reflecting mirror, said reflecting member and said shutter-release lever to swing said reflecting member in conjunction with said reflecting mirror out of the light rays passing through said direct vision view finder upon pressing said shutter-release lever.

2. A mirror reflex photographic camera as claimed in claim 1, wherein said photoelectric cell forming part of an exposure meter is slidably mounted on said finder, and wherein the sliding movement of said photoelectric cell is operative to actuate said first lever means to swing said reflecting member out of the path of the light rays passing through said direct vision view finder.

3. A mirror reflex photographic camera as claimed in claim 2, wherein said means for moving said photoelectric cell includes a carrier provided with a projection, said projection being in abutting engagement with said first lever means.

4. A reflex photographic camera as claimed in claim 3, wherein said reflecting member is provided with a pin in engagement with said first lever means.

5. A mirror reflex photographic camera as claimed in claim 1, wherein said view finder includes an ocular, and further comprising a lense interposed between said ocular and said reflecting member, said lense being connected with said reflecting member to provide movement thereof in unison with said reflecting member and to thereby automatically swing out said lense in unison with said reflecting member.

References Cited in the file of this patent

UNITED STATES PATENTS

| 1,746,741 | Reiterer et al. | Feb. 11, 1930 |
| 2,576,494 | Waggin | Nov. 27, 1951 |

FOREIGN PATENTS

| 469,710 | Germany | Dec. 19, 1928 |
| 688,660 | Germany | Feb. 27, 1940 |
| 884,054 | France | Apr. 12, 1943 |
| 890,808 | France | Nov. 19, 1943 |
| 232,142 | Switzerland | Aug. 1, 1944 |